US011985460B1

(12) United States Patent
Lu

(10) Patent No.: US 11,985,460 B1
(45) Date of Patent: May 14, 2024

(54) MAGNETIC FLUID SPEAKER

(71) Applicant: Lightning Wolf Inc, Chicago, IL (US)

(72) Inventor: Xingcheng Lu, Jiujiang (CN)

( * ) Notice: Subject to any disclaimer, the term of this patent is extended or adjusted under 35 U.S.C. 154(b) by 0 days.

(21) Appl. No.: 18/423,593

(22) Filed: Jan. 26, 2024

(51) Int. Cl.
*H04R 1/02* (2006.01)
*H04R 9/06* (2006.01)

(52) U.S. Cl.
CPC ......... *H04R 1/028* (2013.01); *H04R 2499/15* (2013.01)

(58) Field of Classification Search
CPC ...................................................... H04R 1/028
See application file for complete search history.

(56) References Cited

U.S. PATENT DOCUMENTS 4,017,694 A * 4/1977 King ......................... H01F 1/44 381/415
4,308,603 A * 12/1981 Overby, III ............ H04R 23/00 367/141
5,220,841 A * 6/1993 Brown ...................... G01F 1/58 73/861.12
2012/0106774 A1* 5/2012 Saiki ........................ H04R 7/18 381/415
2020/0092647 A1* 3/2020 Palmer ..................... H04R 3/04

* cited by examiner

*Primary Examiner* — Simon King

(57) ABSTRACT

Disclosed is a magnetic fluid speaker, including a housing, a control panel and loudspeaker assemblies, where the housing is provided with an accommodating cavity, the housing is further provided with windows, and the windows are configured for communicating the outside and the accommodating cavity; the control panel and the loudspeaker assemblies are both arranged in the accommodating cavity, where the loudspeaker assemblies are directly opposite to the windows, and the loudspeaker assemblies are electrically connected to the control panel; an electromagnetic device is arranged on each loudspeaker assembly, the electromagnetic device is electrically connected to the control panel, the electromagnetic devices are arranged on the loudspeaker assemblies, the magnetic fluid display devices are arranged in the windows, the magnetic fluid display device is exposed on the outer surface of the housing, and the magnetic fluid display device is located at the front side of the electromagnetic device.

10 Claims, 5 Drawing Sheets

MAGNETIC FLUID SPEAKER

TECHNICAL FIELD

The present disclosure relates to the technical field of audio products, and particularly relates to a magnetic fluid speaker.

BACKGROUND

With social progress, people yearn for a more colorful life. Song and dance, as a entertainment form that has been passed down for thousands of years, has been deeply rooted in the lives of people of all ethnic groups. However, with the development and progress of technology, people have raised increasing and more stringent requirements for the performance forms and venues of song and dance, audio systems have been continuously improved to meet people's needs, and audio products have been developed continuously and become very mature. In addition to professional audio products, existing audio products are usually combined with various existing equipment to exert a new role.

Currently, an audio product is mainly a bluetooth speaker, mainly including a housing, a control panel and loudspeaker assemblies, where the housing is provided with an accommodating cavity, sound holes are formed on the housing, and the sound holes are configured for communicating the outside and the accommodating cavity; the control panel and the loudspeaker assemblies are both arranged in the accommodating cavity, where the loudspeaker assemblies are directly opposite to the sound holes, and the loudspeaker assemblies are electrically connected to the control panel. However, this kind of audio product only plays a role of playing music, is relatively single in functions, and is incapable to meet sound visualization needs and facilitate users' pursuit of increasing diversity and personality. Therefore, it is necessary to improve the existing audio products.

SUMMARY

In view of this, aiming at the deficiencies in the prior art, a main objective of the present disclosure is to provide a magnetic fluid speaker that is capable to effectively solve the problem that existing audio products cannot meet sound visualization needs.

To achieve the above objective, the present disclosure adopts the following technical solution:

a magnetic fluid speaker, including a housing, a control panel and loudspeaker assemblies, where the housing is provided with an accommodating cavity, the housing is further provided with windows, and the windows are configured for communicating the outside and the accommodating cavity; the control panel and the loudspeaker assemblies are both arranged in the accommodating cavity, where the loudspeaker assemblies are directly opposite to the windows, and the loudspeaker assemblies are electrically connected to the control panel; and an electromagnetic device is arranged on each loudspeaker assembly, the electromagnetic device is electrically connected to the control panel, the magnetic fluid display devices are arranged in the windows, the magnetic fluid display device is exposed on the outer surface of the housing, and the magnetic fluid display device is located at the front side of the electromagnetic device.

Two windows are bilaterally arranged in a symmetrical manner, correspondingly, both two loudspeaker assemblies and two magnetic fluid display devices are bilaterally arranged in a symmetrical manner, the two loudspeaker assemblies are directly opposite to the two windows respectively, and the two magnetic fluid display devices are respectively arranged in the two windows.

The housing includes a front housing, a rear cover, an end cover and an outer sleeve, where the front housing, the rear cover and the end cover are spliced and enclosed to form the accommodating cavity, the outer sleeve is sleeved outside the front housing and the rear cover, the outer sleeve is in clearance fit with the front housing, a plurality of sound holes are formed on the outer sleeve, the plurality of sound holes are communicated with the accommodating cavity, and the windows are located on the front housing and the outer sleeve.

Preferably, a radiator is arranged on the front housing.

Preferably, a storage battery is arranged in the accommodating cavity, and the storage battery is electrically connected to the control panel.

Preferably, the control panel is connected to a button panel, and the button panel is exposed on the housing.

Preferably, the magnetic fluid display device comprises a transparent box body and a magnetic fluid enclosed in the transparent box body.

Preferably, the transparent box body is made of glass or plastic.

Preferably, the transparent box body has a disc-shaped structure.

Preferably, the housing has a rectangular structure.

Compared with the prior art, the present disclosure has obvious advantages and beneficial effects, and specifically, it can be seen from the above technical solution that:

the electromagnetic devices are arranged on the loudspeaker assemblies, the magnetic fluid display devices are arranged in the windows, the magnetic fluid display device is exposed on the outer surface of the housing, and the magnetic fluid display device is located at the front side of the electromagnetic device, so that the electromagnetic device generates a changing magnetic field with changes in sound, thereby controlling the magnetic fluid display device, achieving sound visualization, and facilitating users' pursuit of increasing diversity and personality.

DESCRIPTION OF REFERENCE NUMERALS

10, housing; 11, front housing; 12, rear cover; 13, end cover; 14, outer sleeve; 15, radiator; 101, accommodating cavity; 102, window; 103, sound hole; 20, control panel; 30, loudspeaker assembly; 31, electromagnetic device; 40, magnetic fluid display device; 41, transparent box body; 42, magnetic fluid; 50, storage battery; and 60, button panel.

DETAILED DESCRIPTIONS OF THE EMBODIMENTS

Figure 1:
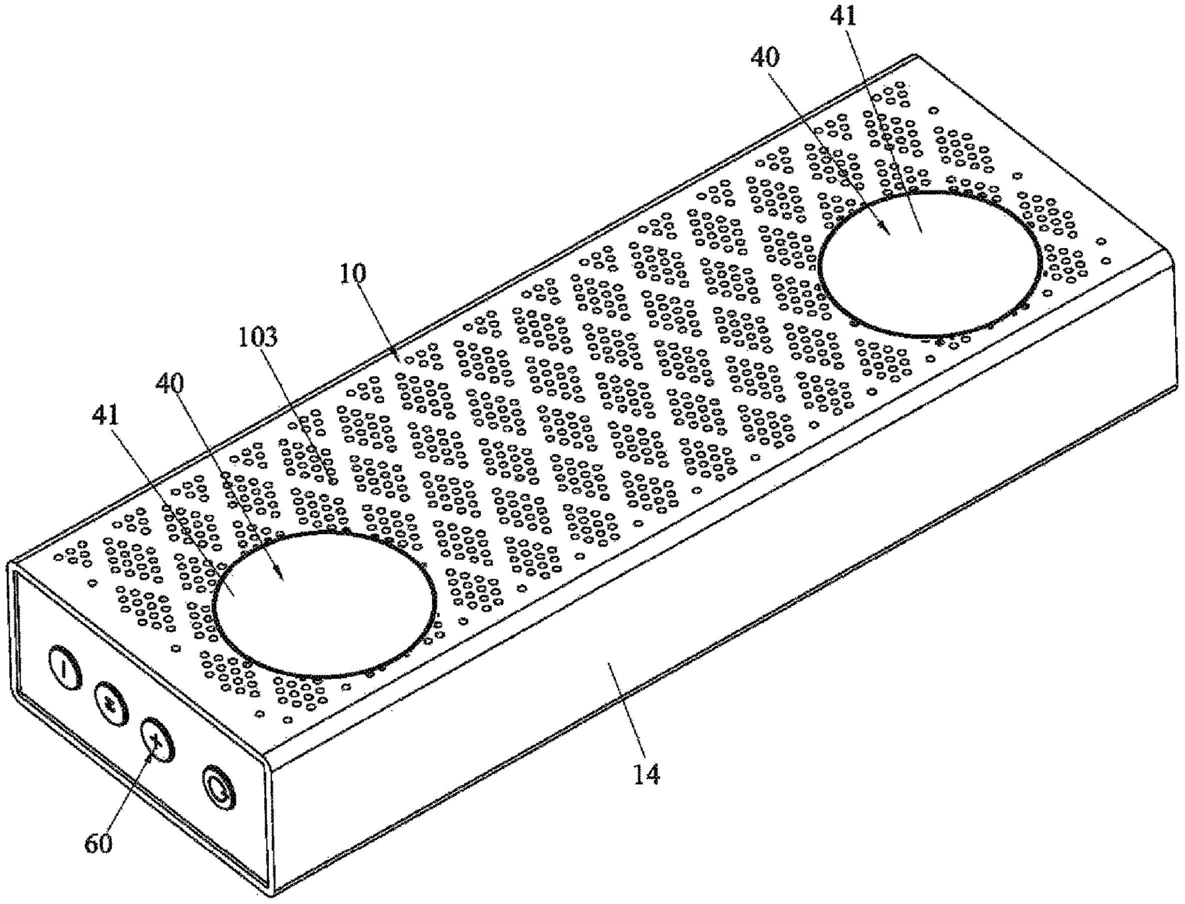
FIG. 1 is a three-dimensional schematic diagram of assembly of a preferred embodiment of the present disclosure.
Figure 2:
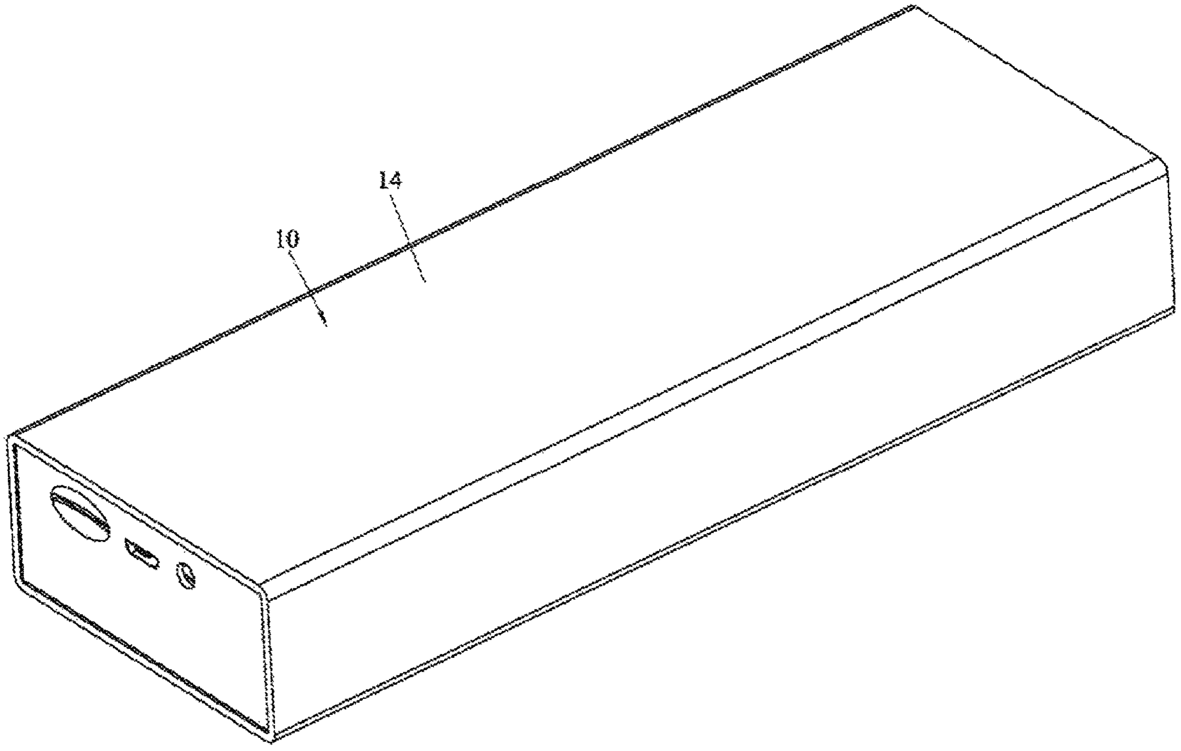
FIG. 2 is a three-dimensional schematic diagram of assembly of a preferred embodiment of the present disclosure from another perspective.
Figure 3:
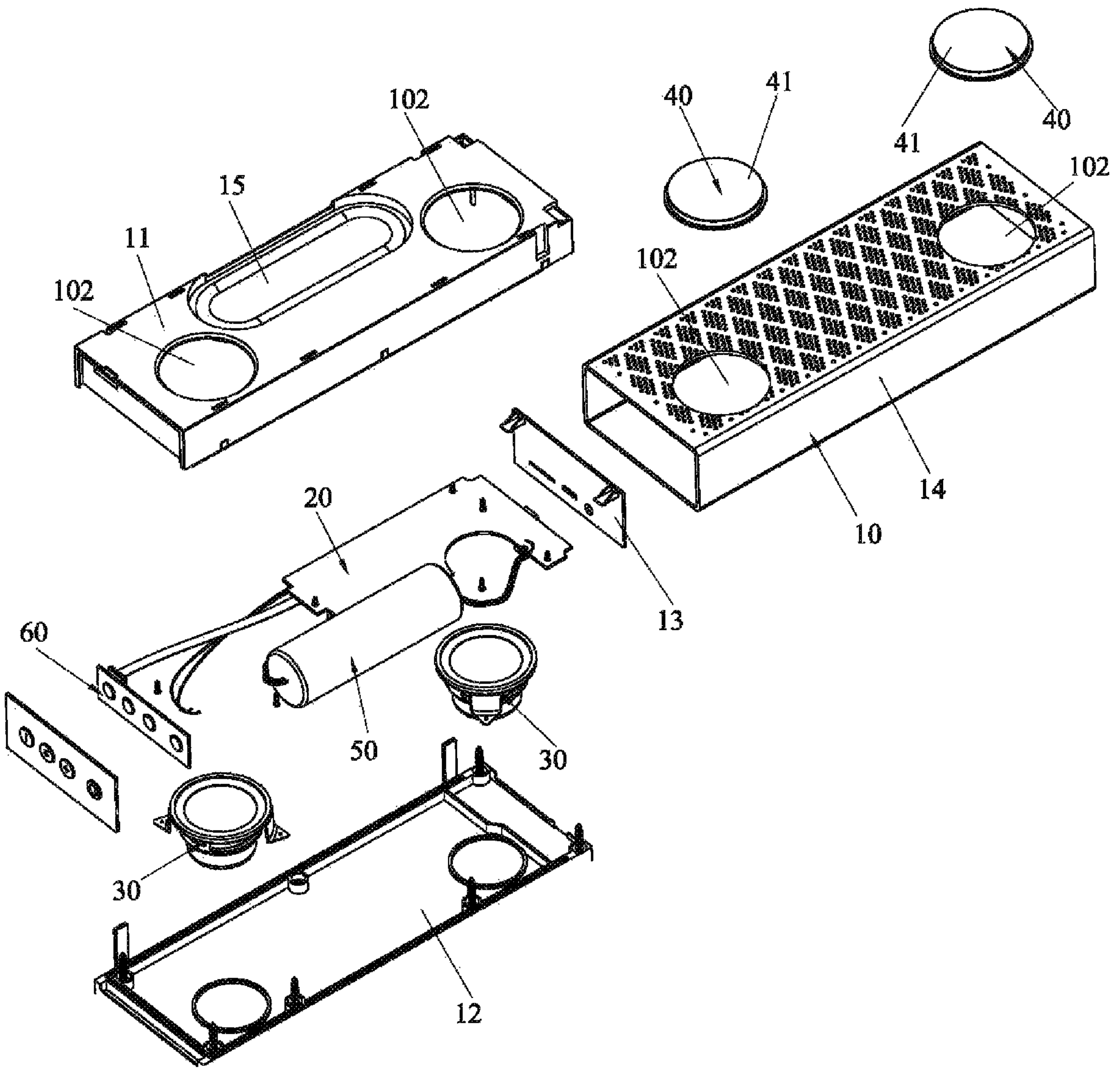
FIG. 3 is an exploded view of a preferred embodiment of the present disclosure.
Figure 4:
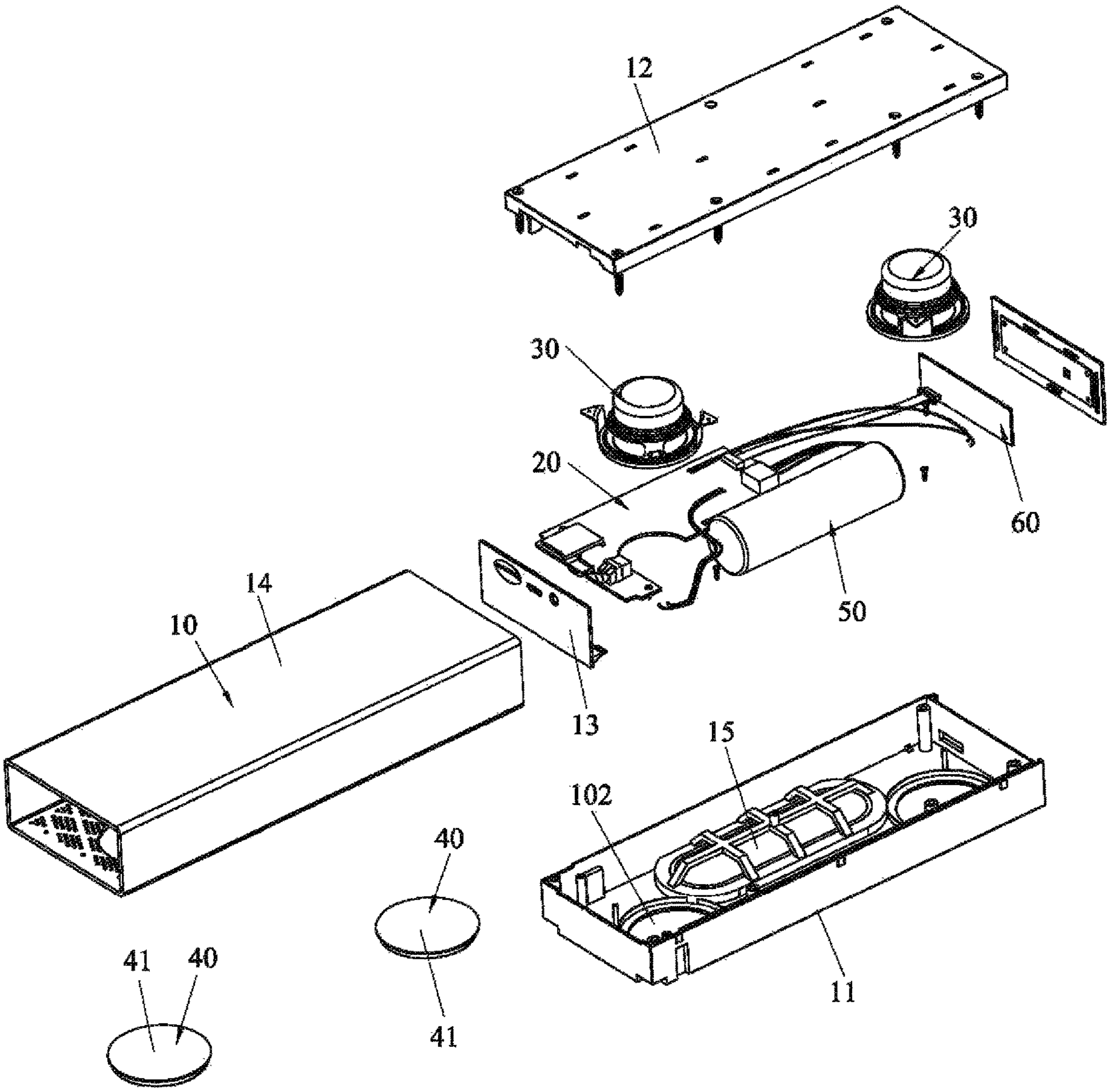
FIG. 4 is an exploded view of a preferred embodiment of the present disclosure from another perspective.
Figure 5:
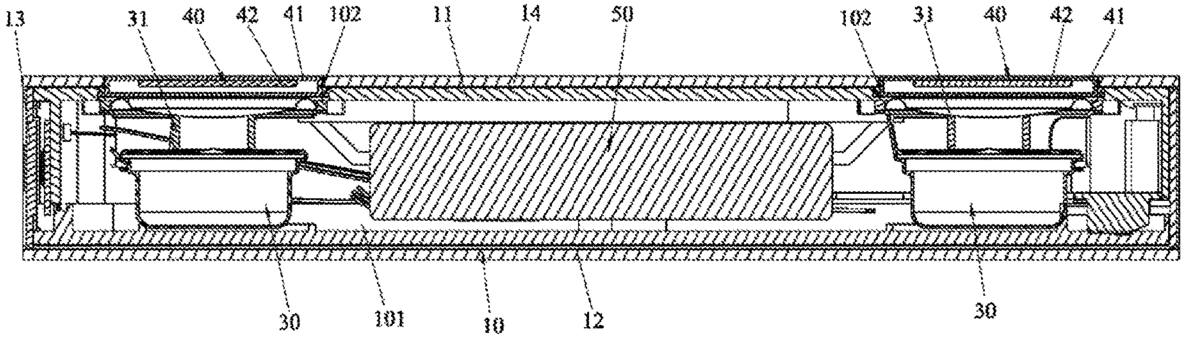
FIG. 5 is a sectional view of a preferred embodiment of the present disclosure.

With reference to FIGS. 1-5, a specific structure of the present disclosure in a preferred embodiment is shown, including a housing 10, a control panel 20 and loudspeaker assemblies 30.

The housing 10 is provided with an accommodating cavity 101, and the housing 10 is further provided with windows 102, where the windows 102 are configured for communicating the outside and the accommodating cavity 101. Specifically, the housing 10 includes a front housing 11, a rear cover 12, an end cover 13 and an outer sleeve 14, where the front housing 11, the rear cover 12 and the end cover 13 are spliced and enclosed to form the accommodating cavity 101, the outer sleeve 14 is sleeved outside the front housing 11 and the rear cover 12, the outer sleeve 14 is in clearance fit with the front housing 11, a plurality of sound holes 103 are formed on the outer sleeve 14, the plurality of sound holes 103 are communicated with the accommodating cavity 101, and the windows 102 are located on the front housing 11 and the outer sleeve 14 to facilitate outward sound transmission. In addition, a radiator 15 is arranged on the front housing 11 for better outward sound transmission. Further, the housing 10 has a rectangular structure, looking simple and beautiful in shape. Furthermore, two windows 102 are bilaterally arranged in a symmetrical manner.

The control panel 20 and the loudspeaker assemblies 30 are both arranged in the accommodating cavity 101, where the loudspeaker assemblies 30 are directly opposite to the windows 102, the loudspeaker assemblies 30 are electrically connected to the control panel 20, an electromagnetic device 31 is arranged on each loudspeaker assembly 30, and the electromagnetic device 31 is electrically connected to the control panel 20.

A magnetic fluid display device 40 is arranged in each window 102, the magnetic fluid display device 40 is exposed on an outer surface of the housing 10, and the magnetic fluid display device 40 is located at a front side of the electromagnetic device 31. In this embodiment, the magnetic fluid display device 40 includes a transparent box body 41 and a magnetic fluid 42 enclosed in the transparent box body 41, where the transparent box body 41 is made of glass or plastic (no limitation on materials), and the transparent box body 41 has a disc-shaped structure (no limitation on shapes). The magnetic fluid 42 is composed of magnetic nanometer particles, a base solution and a surfactant, and has both fluidity of liquid and magnetism of magnetic solid materials. Further, both two loudspeaker assemblies 30 and two magnetic fluid display devices 40 are bilaterally arranged in a symmetrical manner, the two loudspeaker assemblies 30 are directly opposite to the two windows 102 respectively, and the two magnetic fluid display devices 40 are respectively arranged in the two windows 102.

Furthermore, a storage battery 50 is arranged in the accommodating cavity 101, and the storage battery 50 is electrically connected to the control panel 20 to provide power to the control panel 20. In addition, the control panel 20 is connected to a button panel 60, and the button panel 60 is exposed on the housing 10 to facilitates control.

A detailed working process of this embodiment is as follows:

During working, when an audio signal is transmitted to the loudspeaker assemblies 30 through the control panel 20, the loudspeaker assemblies 30 play sound, at the same time, the control panel 20 analyzes the audio signal and generates an analog signal, and the analog signal is amplified and transmitted to an electromagnetic coil of the electromagnetic device 31 through a conversion circuit, so that the electromagnetic coil generates a magnetic field, then the magnetic field and the magnetic fluid 42 inside the transparent box body 41 cause magnetic field induction, and the originally static magnetic fluid 42 can immediately bounce once feeling energy, thus achieving sound visualization.

A design focus of the present disclosure is as follows: the electromagnetic devices are arranged on the loudspeaker assemblies, the magnetic fluid display devices are arranged in the windows, the magnetic fluid display device is exposed on the outer surface of the housing, and the magnetic fluid display device is located at the front side of the electromagnetic device, so that the electromagnetic device generates a changing magnetic field with changes in sound, thereby controlling the magnetic fluid display device, achieving sound visualization, and satisfying users' pursuit of increasing diversity and personality.

Technical principles of the present disclosure are described above with reference to specific embodiments. These descriptions are only intended to explain the principles of the present disclosure and cannot be interpreted, in any way, as limiting the protection scope of the present disclosure. Based on the explanation, other specific embodiments of the present disclosure can be contemplated by those skilled in the art without making creative efforts, and all these embodiments fall within the protection scope of the present disclosure.

What is claimed is:

1. A magnetic fluid speaker, comprising a housing, a control panel and loudspeaker assemblies, wherein the housing is provided with an accommodating cavity, the housing is further provided with windows, and the windows are configured for communicating the outside and the accommodating cavity; the control panel and the loudspeaker assemblies are both arranged in the accommodating cavity, where the loudspeaker assemblies are directly opposite to the windows, and the loudspeaker assemblies are electrically connected to the control panel; and an electromagnetic device is arranged on each loudspeaker assembly, the electromagnetic device is electrically connected to the control panel, the magnetic fluid display devices are arranged in the windows, the magnetic fluid display device is exposed on the outer surface of the housing, and the magnetic fluid display device is located at the front side of the electromagnetic device.

2. The magnetic fluid speaker according to claim 1, wherein two windows are bilaterally arranged in a symmetrical manner, correspondingly, both two loudspeaker assemblies and two magnetic fluid display devices are bilaterally arranged in a symmetrical manner, the two loudspeaker assemblies are directly opposite to the two windows respectively, and the two magnetic fluid display devices are respectively arranged in the two windows.

3. The magnetic fluid speaker according to claim 1, wherein the housing comprises a front housing, a rear cover, an end cover and an outer sleeve, wherein the front housing, the rear cover and the end cover are spliced and enclosed to form the accommodating cavity, the outer sleeve is sleeved outside the front housing and the rear cover, the outer sleeve is in clearance fit with the front housing, a plurality of sound holes are formed on the outer sleeve, the plurality of sound holes are communicated with the accommodating cavity, and the windows are located on the front housing and the outer sleeve.

4. The magnetic fluid speaker according to claim 3, wherein a radiator is arranged on the front housing.

5. The magnetic fluid speaker according to claim 1, wherein a storage battery is arranged in the accommodating cavity, and the storage battery is electrically connected to the control panel.

6. The magnetic fluid speaker according to claim 1, wherein the control panel is connected to a button panel, and the button panel is exposed on the housing.

7. The magnetic fluid speaker according to claim 1, wherein the magnetic fluid display device comprises a transparent box body and a magnetic fluid enclosed in the transparent box body.

8. The magnetic fluid speaker according to claim 7, wherein the transparent box body is made of glass or plastic.

9. The magnetic fluid speaker according to claim 7, wherein the transparent box body has a disc-shaped structure.

10. The magnetic fluid speaker according to claim 7, wherein the housing has a rectangular structure.

* * * * *